3,332,889
RESINOUS POLYMERIC REACTION PRODUCTS OF PHOSPHORUS AND A POLYAMINE
Martin Epstein and Sheldon A. Buckler, Stamford, Allan Ellis Sherr, Norwalk, and Helen Currier Gillham, Stamford, Conn., assignors to American Cyanamid Company, Stamford, Conn., a corporation of Maine
No Drawing. Filed Feb. 17, 1964, Ser. No. 345,073
10 Claims. (Cl. 260—2)

ABSTRACT OF THE DISCLOSURE

This invention relates to a method for the production of a polymer which comprises reacting elemental phosphorus with a polyamine at a temperature of 0–100° C., with agitation and in the presence of an inert gas, the concentration of phosphorus ranging from 0.5–50%, by weight, based on the total weight of phosphorus and polyamine and polymers produced thereby.

---

The search for compounds or compositions of matter as flame retardants for thermoplastic polymers has been intensively conducted in industry. The use of materials containing phosphorus and/or nitrogen as flame retardant additives has been well recognized, as has been the use of various halogenated materials such as the halogenated styrene copolymers and various additive mixtures such as chlorinated paraffin wax with triphenyl stibine, chlorinated paraffins with aliphatic antimony compounds, and antimony oxide-chlorinated hydrocarbon mixtures. A drawback, however, in regard to the known prior art materials which have been used as flame retardants, has been the fact that generally a large amount, i.e. upwards of 35%, of the additive must be incorporated into the polymer in order to make it sufficiently flame retardant. Additionally, the known flame retardant additives have a tendency to crystallize or oil out of the resin after a relatively short time of incorporation.

We have found a new group of polymers which contain both phosphorous and nitrogen groups and which may be added to thermoplastic resins, in relatively small amounts, to produce excellent flame retardant compositions. A further feature resides in the fact that these new additives do not crystallize or oil out after incorporation into the resin. The production of thermoplastic resin compositions which are flame retardant, i.e. have high resistance to burning, is of considerable commercial importance. For example, such articles as castings, moldings, foamed or laminated structures and the like are required, or at least desired, to be resistant to fire and flame and to possess the ability to endure heat without deterioration. Typical illustrations of applications of materials of this type include moldings for live electrical contacts which should not be ignited or deteriorated by heat and sparks. Additionally, structural members such as pipes, wall coverings, wall paneling, glazing, etc. and articles such as ash trays, waste baskets, fibers and the like are further examples of products wherein flame retardance is desirable.

It is therefore an object of the present invention to provide a novel group of polymeric materials.

It is a further object of the present invention to provide a method for the production of a novel group of polymeric materials having a high nitrogen and phosphorus content.

It is a further object of the present invention to provide flame retardant compositions comprising thermoplastic polymers containing a flame-retarding amount of a polymeric material having a high phosphorus and nitrogen content.

These and other objects will become more apparent to those skilled in the art upon reading the more detailed description set forth hereinbelow.

THE NOVEL METHOD AND POLYMERS

Our novel method by which the novel polymeric materials of the instant invention are produced comprises reacting elemental phosphorus with a polyamine under various reaction conditions. The reaction occurs via interaction between the nitrogen of the polyamine and the elemental phosphorus and results in the production of polymeric materials having relatively high molecular weights. The polymeric materials are solid and are insoluble in most organic solvents such as acetone, acetonitrile, methanol, ethanol, benzene, toluene, and the like.

The reaction is conducted utilizing concentrations of phosphorus ranging from about 0.5% to about 50%, by weight, based on the total weight of reactants. A concentration ranging from about 1% to about 15%, by weight, is, however, generally preferred.

The reaction is preferably conducted in the presence of an inert gas blanket so as to prevent reaction of the elemental phosphorus with constituents in the atmosphere. It is possible, however, to conduct the reaction in the presence of the atmosphere if the phosphorus is prevented from extensive contact therewith prior to and during the reaction. Examples of inert gases which may be utilized for this purpose include nitrogen, argon, neon, carbon dioxide, carbon monoxide, normally gaseous hydrocarbons such as butane and the like.

The reaction is conducted at a temperature ranging from about 0° C. to about 100° C., preferably from about 15° C. to about 30° C. and under atmospheric pressure. Subatmospheric or superatmospheric pressures may be used, however, if the conditions under which the reaction is conducted so dictate. The reactants are generally contacted with one another under mild agitation until the phosphorus is entirely depleted or until no more phosphorus goes into the solution, i.e. reacts with the polyamine. Generally, under the normal conditions specified above, the reaction is complete in from about 1 to about 48 hours, however, depending upon the concentration of phosphorus, volumes of both components and degree of agitation, greater reaction times may be necessary, i.e. upwards of 100 hours.

Our novel polymers are recovered from the reaction media by precipitating them from a compound which is a solvent for the unreacted polyamine and a nonsolvent for the polymer. Examples of compounds useful for this purpose include those set forth hereinabove and others, such as, carbon disulfide, alkyl amines such as methylamine, ethylamine, ethanol, acetone, etc. The polymers may also be recovered by distilling off the excess polyamine under vacuum provided the specific compound being reacted has a low boiling point, i.e. lower than the temperature at which the polymer is subject to deterioration.

Examples of polyamines which may be utilized in our novel process to produce our novel polymers include such compounds as the alkylene polyamines, e.g. ethylenediamine, diethylenetriamine, trimethylenediamine, pentamethylenediamine, hexamethylenediamine, decamethylenediamine, triethylenetetramine, hexamethylenetetramine, 1,2-propanediamine, etc., N,N-diethylethylenediamine, 1,6-hexanediamine, 3,3′-diaminodipropylamine, 2,4-diaminodiphenylamine, 4′,4′-methylenedianiline, N,N-dimethyl-1,3-propanediamine, the arylene diamines, i.e., phenyldiamine, benzidine, toluenediamine, 1,2-naphthylenediamine, 2,3-naphthylenediamine, etc., compounds having the formula (I)
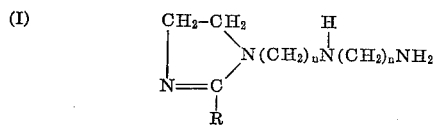

wherein R is an alkyl radical of from 1–20 carbon atoms, inclusive, and $n$ is a whole positive integer of from about 1–4 inclusive.

Examples of amines represented by Formula I, above include:

1-[[(aminomethyl)amino]methyl]-2-methyl-2-imidazoline,
1-[2-[(2-aminoethyl)amino]ethyl]-2-methyl-2-imidazoline,
1-[3-[(3-aminopropyl)amino]propyl]-2-methyl-2-imidazoline,
1-[4-[(4-aminobutyl)amino]butyl]-2-methyl-2-imidazoline,
1-[[(aminomethyl)amino]methyl]-2-ethyl-2-imidazoline,
1-[2-[(2-aminoethyl)amino]ethyl]-2-ethyl-2-imidazoline,
1-[3-[(3-aminopropyl)amino]propyl]-2-ethyl-2-imidazoline,
1-[4-[(4-aminobutyl)amino]butyl]-2-ethyl-2-imidazoline,
1-[[(aminomethyl)amino]methyl]-2-propyl-2-imidazoline,
1-[2-[(2-aminoethyl)amino]ethyl]-2-propyl-2-imidazoline,
1-[3-[(3-aminopropyl)amino]propyl]-2-propyl-2-imidazoline,
1-[4-[(4-aminobutyl)amino]butyl]-2-propyl-2-imidazoline,
1-[[(aminomethyl)amino]methyl]-2-butyl-2-imidazoline,
1-[2-[(2-aminoethyl)amino]ethyl]-2-butyl-2-imidazoline,
1-[3-[(3-aminopropyl)amino]propyl]-2-butyl-2-imidazoline,
1-[4-[(4-aminobutyl)amino]butyl]-2-butyl-2-imidazoline,
1-[[(aminomethyl)amino]methyl]-2-heptyl-2-imidazoline,
1-[2-[(2-aminoethyl)amino]ethyl]-2-heptyl-2-imidazoline,
1-[3-[(3-aminopropyl)amino]propyl]-2-heptyl-2-imidazoline,
1-[4-[(4-aminobutyl)amino]butyl]-2-heptyl-2-imidazoline,
1-[[(aminomethyl)amino]methyl]-2-octyl-2-imidazoline,
1-[2-[(2-aminoethyl)amino]ethyl]-2-octyl-2-imidazoline,
1-[3-[(3-aminopropyl)amino]propyl]-2-octyl-2-imidazoline,
1-[4-[(4-aminobutyl)amino]butyl]-2-octyl-2-imidazoline,
1-[[(aminomethyl)amino]methyl]-2-dodecyl-2-imidazoline,
1-[2-[(2-aminoethyl)amino]ethyl]-2-dodecyl-2-imidazoline,
1-[3-[(3-aminopropyl)amino]propyl]-2-dodecyl-2-imidazoline,
1-[4-[(4-aminobutyl)amino]butyl]-2-dodecyl-2-imidazoline,
1-[[(aminomethyl)amino]methyl]-2-heptadecyl-2-imidazoline,
1-[2-[(2-aminoethyl)amino]ethyl]-2-heptadecyl-2-imidazoline,
1-[3-[(3-aminopropyl)amino]propyl]-2-heptadecyl-2-imidazoline,
1-[4-[(4-aminobutyl)amino]butyl]-2-heptadecyl-2-imidazoline,
1-[[(aminomethyl)amino]methyl]-2-octadecyl-2-imidazoline,
1-[2-[(2-aminoethyl)amino]ethyl]-2-octadecyl-2-imidazoline,
1-[3-[(3-aminopropyl)amino]propyl]-2-octadecyl-2-imidazoline,
1-[4-[(4-aminobutyl)amino]butyl]-2-octadecyl-2-imidazoline,
1-[[(aminomethyl)amino]methyl]-2-eicosyl-2-imidazoline,
1-[2-[(2-aminoethyl)amino]ethyl]-2-eicosyl-2-imidazoline,
1-[3-[(3-aminopropyl)amino]propyl]-2-eicosyl-2-imidazoline,
1-[4-[(4-aminobutyl)amino]butyl]-2-eicosyl-2-imidazoline,
and the like.

As mentioned above, these novel polymers are useful as flame retardant agents for thermoplastic resins and as such are used to form our novel flame-retardant compositions more fully set forth hereinbelow.

THE NOVEL FLAME-RETARDANT COMPOSITIONS

The thermoplastic polymers into which the novel polymers of our invention may be incorporated to produce the novel flame retardant compositions of the present invention, are generally the vinyl type polymers wherein the monomeric material is polymerized, by any known method, via the vinyl unsaturation therein. Examples of the vinyl type polymers which may be used to form our novel compositions are the acrylates and methacrylates, the vinyl halides, the vinylidene halides, the vinyl acetates, polyvinyl butyral, butadiene copolymers, acrylonitrile-butadiene-styrene polymers, the acrylonitriles, etc. Additionally and preferably one may incorporate the flame retardant agents mentioned above into such polymers as the α-olefin polymers, such as the homopolymers and copolymers etc. containing, as the major constituent, ethylene, propylene, and the like and the acrylates and methacrylate polymers produced from monomers having the formula (II)
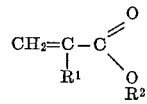

wherein $R^1$ is a hydrogen or methyl radical and $R^2$ is a hydrogen or an alkyl radical having from 1 to 6 carbon atoms, inclusive. Examples of monomers represented by Formula II include methyl acrylate, ethyl acrylate, n-propyl acrylate, isopropyl acrylate, n-butyl acrylate, t-butyl acrylate, isobutyl acrylate, n-amyl acrylate, t-amyl acrylate, hexyl acrylate, and their corresponding alkyl methacrylates.

Additional examples of monomers which may be used to form the thermoplastic vinyl polymers encompassed by the present invention, polymerized either singularly or in combination with each other or with the other compounds set forth hereinabove, are such monomers as the unsaturated alcohol esters, more particularly the allyl, methallyl, vinyl, methvinyl, butenyl, etc., unsaturated esters of aliphatic and aromatic monobasic acids, such, for instance, as acetic, propionic, butyric, crotonic, succinic, glutaric, adipic, maleic, fumaric, itaconic, benzoic, phthalic, terephthalic, benzoylphthalic, etc., acids; the saturated monohydric alcohol esters, e.g., the methyl, propyl, ethyl, isopropyl, butyl, sec.-butyl, amyl, etc., esters of ethylenically unsaturated aliphatic monobasic acids, illustrative examples of which appear above; vinyl cyclic compounds (including monovinyl aromatic hydrocarbons), e.g., styrene, o-, m-, and p-chlorostyrenes, -bromostyrenes, -fluorostyrenes, -methylstyrenes, -ethylstyrenes, -cyanostyrenes, the various poly-substituted styrenes such, for example, as the various di-, tri-, and tetra - chlorostyrenes, -bromostyrenes, -fluorostyrenes, -methylstyrenes, -ethylstyrenes, -cyanostyrenes, etc., vinyl pyridine, dinvinyl benzene, diallyl benzene, the various allyl cyanostyrenes, the various alpha-substituted styrenes and alpha-substituted ring substituted styrenes, e.g., alpha-methyl styrene, alpha-methyl-para-methyl styrene, etc.; unsaturated ethers, e.g., ethyl vinyl ether, diallyl ether, etc.; unsaturated amides, for instance, N-allyl caprolactam, acrylamide and N-substituted acrylamides, e.g., N-methylol acrylamide, N-allyl acrylamide, N-methyl acrylamide, N-phenyl acrylamide, etc.; unsaturated ketones, e.g., methyl vinyl ketone, methyl allyl ketone, etc.; methylene malonic esters, e.g., methylene methyl malonate, etc. and ethylene.

Other examples of monomers that can be used as polymers to form the resin portion of our novel flame-retardant compositions are the vinyl halides, more particularly, vinyl fluoride, vinyl chloride, vinyl bromide, and vinyl iodide, and the various vinylidene compounds, including the vinylidene halides, e.g., vinylidene chloride, vinylidene bromide, vinylidene fluoride, and vinylidene iodide, other comonomers being added, if needed, in order to improve the compatability and copolymerization characteristics of the mixed monomers.

More specific examples of allyl compounds that can be polymerized to useful polymers, useful in the production of our novel flame-retardant compositions, are allyl alcohol, methallyl alcohol, diallyl carbonate, allyl lactate, allyl methacrylate, allyl alphahydroxyisobutyrate, allyl trichlorosilane, diallyl phthalate, diallyl methylgluconate, diallyl tartronate, diallyl tartrate, diallyl mesaconate, the diallyl ester of muconic acid, diallyl chlorophthalate, diallyl dichlorosilane, the diallyl ester of endomethylene tetrahydrophthalic anhydride, triallyl tricarballylate, triallyl, cyanurate, triallyl isocyanurate, triallyl citrate, triallyl phosphate, tetrallyl silane, tetrallyl silicate, hexallyl disiloxane, allyl diglycol carbonate, etc. Other examples of allyl compounds that may be employed are given, for example, in U.S. Patent No. 2,510,503, issued June 6, 1950.

These above mentioned monomers may be polymerized, copolymerized, etc., in any known manner such as by free-radical generating catalysts, irradiation, anion and cation type catalysts and the like, said method of polymerization forming no part of the present invention.

The novel flame-retardant polymers may be incorporated into the thermoplastic resins in flame-retarding amounts, i.e. generally amounts ranging from about 10%, by weight, to about 35%, by weight, preferably 15% to 25%, by weight, based on the weight of the resin have been found sufficient.

These polymers may be incorporated into the resin by any known method. That is to say, the flame-retardant additive may be combined with the resin by milling the resin and the flame-retardant polymer on, for example, a two-roll mill, in a Banbury mixer, etc., or the phosphorus polymer may be added by molding it and resin simultaneously, extruding it and resin or by merely blending the resin in powder form with the phosphorus polymer and thereafter forming the final desired article. Additionally, the novel flame-retardant polymers may also be added during the resin manufacture, i.e. during the monomer polymerization procedure, provided the catalyst etc. and other ingredients of the polymerization system are inert thereto.

It is within the scope of the present invention to incorporate such ingredients as plasticizers, dyes, pigments, fillers, stabilizers, antioxidants, antistatic agents and the like to our novel compositions without detracting from the advantageous properties thereof.

The following examples are set forth for purposes of illustration only and are not to be construed as limitations on the present invention except as set forth in the appended claims. All parts and percentages are by weight unless otherwise specified.

Example 1

1.2 parts of white phosphorus are placed in 45 parts of ethylene diamine (freshly distilled under $N_2$, boiling point 117° C.) and the mixture is agitated by shaking for 60 hours at room temperature in a suitable reaction vessel. A homogeneous red solution results which is then evaporated by means of an aspirator and the residue in the reaction vessel is dried. A black, solid, polymeric product (1.3 parts) is recovered and upon analysis for phosphorus and nitrogen shows: P, 67.97%, N, 12.53%.

Example 2

Into a suitable reaction vessel is placed 1.0 part of phosphorus in 30 parts of triethylenetetramine. The mixture is agitated for 15 hours at room temperature to obtain a homogeneous dark red-black solution. The solution is slowly added to acetone to precipitate the product. A brown solid (2.8 parts) is recovered, washed with acetone and dried. The resinous product is found to consist of 44.74% phosphorus and 10.77% of nitrogen.

Example 3

A suitable reaction vessel is purged with $N_2$ and 52.0 parts of white phosphorus in 1000 parts of ethylenediamine is added thereto. The mixture is stirred for 60 hours at room temperature after which the resultant homogeneous, red solution is slowly added to 5000 parts of acetone while stirring and cooling by an ice bath. A brown solid is precipitated, separated by centrifuging, triturated with acetonitrile, filtered and dried. The polymeric product, 50 parts, analyzes for 43.19% phosphorus and 9.25% nitrogen.

Example 4

A suitable reaction vessel is purged with $N_2$ and to it is added one part of white phosphorus in 20 parts of 1-[2-[(2-aminoethyl)amino]ethyl]-2-heptyl-2-imidazoline. The mixture is stirred for 60 hours at room temperature and a red-purple homogeneous solution results. The solution is slowly added to acetone to precipitate a polymeric product as a brown solid which analyzes for 23.70% phosphorus and 12.96% nitrogen.

Example 5

Into a suitable reaction vessel, purged with $N_2$, is placed 1.0 part of phosphorus in 25 parts diethylenetriamine. The mixture is stirred for 15 hours at room temperature and a dark red solution forms. The solution is slowly poured into acetone to precipitate a brown, solid polymer. The brown product (1.5 parts) is analyzed for phosphorus and nitrogen: P, 49.12%, N, 12.01%.

Example 6

Into a suitable reaction vessel, kept at 65° C. and purged with $N_2$, is placed 24.6 parts of 1-[2-[(2-aminoethyl)amino]ethyl]-2-heptadecyl-2-imidazoline and one part of phosphorus. The mixture is stirred for 10 hours and a dark solution forms which solidifies on cooling. The solution is added to acetone to precipitate 1.7 parts of dried polymeric product. The composition of the resin is 54.45% phosphorus and 9.23% nitrogen.

Following the procedure of Example 1, various reactions were carried out utilizing different amines. The results of these reactions are set forth below in Table I.

TABLE I

| Example | Amine | Temp., °C. | Polymer Yield (pts.) |
|---|---|---|---|
| 7 | TMDA | 23 | 2.7 |
| 8 | HMTA | 65 | 1.5 |
| 9 | DEDA | 23 | 2.1 |
| 10 | DADPA | 23 | 1.8 |
| 11 | PDA | 48 | 1.9 |
| 12 | NDA | 48 | 1.7 |
| 13 | MMI | 23 | 2.2 |
| 14 | BBBI | 85 | 1.5 |
| 15 | EEOI | 95 | 2.0 |
| 16 | EEEI | 95 | 2.3 |
| 17 | PPDI | 90 | 1.6 |

CODE FOR TABLE I

TMDA=trimethylenediamine; HMTA=hexamethylenetetramine; DEDA=N,N-diethyl ethylenediamine; DADPA=3,3'-diaminodipropylamine; PDA=phenyldiamine; NDA=1,2 - naphthylenediamine; MMI=1-[[(aminomethyl)amino]methyl] - 2 - methyl - 2 - imidazoline; BBBI=1-[4-[(4-aminobutyl)amino]butyl]-2-butyl-2-imidazoline; EEOI=1-[2-[(2 - aminoethyl)amino]ethyl]-2-octyl-2-imidazoline; EEEI=1-[2-[(2-aminoethyl)amino]ethyl]-2-eicosyl-2-imidazoline; and PPDI=1-[3-[(3-aminopropyl)amino]propyl] - 2 - dodecyl-2-imidazoline.

Any appropriate flame retardance test may be used to determine the flame retardance properties of any specific composition. One test which is reasonably efficient is that designated as a modified version of ASTM test D-635-56T. The specifications for this test are: a specimen, 5" in length, 0.5" in width and 0.045" in thickness, is marked at the 1" and 4" lengths and is then supported with its longitudinal axis horizontal and its transverse axis inclined at 45° to the horizontal. A Bunsen burner with a 1' blue flame is placed under the free end of the strip and is adjusted so that the flame tip is just in contact with the strip. At the end of 30 seconds, the flame is removed and the specimen is allowed to burn. If the specimen does not continue to burn after the first ignition it is immediately recontacted with the burner for another 30 second period. If after the two burnings, the strip is not burned to the 4" mark, the specimen is designated as "self-extinguishing" or "flame-retardant."

Example 18

Eighty-five parts of polyethylene and 15 parts of the polymer produced in Example 3 are rolled together on a two-roll mill at about 170° C. The resulting milled composition is molded into strips 5' 'in length, 0.5" in width and 0.45" in thickness and said strips are then subjected to an art recognized flame retardance test. The strips passed the test and are therefore designated as flame retardant.

Following the procedure of Example 18, the following examples were carried out utilizing various flame retardants of the instant invention and various thermoplastic resin polymers. The results of these examples are set forth in Table II, below. In each instance, the resultant composition passed the flame-retardance test and was designated as flame and fire retardant. In the table, PE= composition is molded into strips 5" in length, 0.5" in methacrylate), PMA=poly(methacrylic acid), PA=poly(acrylic acid), AN=acrylonitrile, ST=styrene and BD=butadiene.

TABLE II

| Ex. | Resin | Flame Retardant of Example | Percent |
|---|---|---|---|
| 19 | PMMA | 1 | 20 |
| 20 | Terpolymer MMA/ST/AN 71/19/10 | 4 | 25 |
| 21 | PP | 2 | 20 |
| 22 | Mixture of BD-AN (10-75%) and AN-ST (25-90%).[1] | 6 | 25 |
| 23 | PE | 7 | 15 |
| 24 | PA | 3 | 10 |
| 25 | PMMA | 10 | 15 |
| 26 | PE | 12 | 15 |
| 27 | Same as 22 | 1 | 30 |
| 28 | PP | 5 | 15 |
| 29 | ST/AN 80/20 | 8 | 25 |
| 30 | Same as 20 | 14 | 30 |
| 31 | PMMA | 5 | 20 |
| 32 | PE | 6 | 15 |
| 33 | PP | 13 | 25 |
| 34 | PA | 16 | 20 |
| 35 | PMA | 3 | 15 |
| 36 | PMMA | 3 | 10 |

[1] U.S. Patent No. 2,439,202.

We claim:

1. A method for the production of a resinous polymer having a high phosphorus and nitrogen content which comprises reacting elemental phosphorus with a polyamine selected from the group consisting of alkylene and arylene polyamines and compounds having the formula

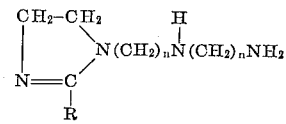

wherein R is an alkyl radical of 1–20 carbon atoms, inclusive, and $n$ is a whole positive integer of from about 1–4, inclusive at a temperature ranging from about 0° C. to about 100° C., with agitation and in the presence of an inert gas, the concentration of phosphorus ranging from about 0.5% to about 50%, by weight, based on the total weight of phosphorus and polyamine and recovering the resultant polymer.

2. A method according to claim 1 wherein the polyamine is ethylene diamine.

3. A method according to claim 1 wherein the polyamine is triethylene tetramine.

4. A method according to claim 1 wherein the polyamine is 1-[2-[(2-aminoethyl)amino]ethyl]-2-heptyl-2-imidazoline.

5. A method according to claim 1 wherein the polyamine is diethylene triamine.

6. The product produced by the process of claim 1.
7. The product produced by the process of claim 2.
8. The product produced by the process of claim 3.
9. The product produced by the process of claim 4.
10. The product produced by the process of claim 5.

No references cited.

SAMUEL H. BLECH, *Primary Examiner.*